United States Patent
Moriyama

[11] 3,775,002
[45] Nov. 27, 1973

[54] VARIABLE SECTOR SHUTTER DEVICE
[75] Inventor: Inao Moriyama, Sagamihara, Japan
[73] Assignee: Canon Kabushiki Kaisha, Tokyo, Japan
[22] Filed: Aug. 4, 1971
[21] Appl. No.: 168,859

[30] Foreign Application Priority Data
Aug. 7, 1970  Japan....... 45/78565 (utility model)
Aug. 7, 1970  Japan....... 45/78566 (utility model)

[52] U.S. Cl. ............................................. 352/216
[51] Int. Cl. ............................................... G03b 9/10
[58] Field of Search............................. 352/216, 217

[56] References Cited
UNITED STATES PATENTS
3,602,585  8/1971  Steibl................................. 352/216
3,196,457  7/1965  Buck................................ 352/216 X
3,135,156  6/1964  Thevenaz........................... 352/194

Primary Examiner—Monroe H. Hayes
Attorney—David Toren et al.

[57] ABSTRACT

In a variable sector shutter device for a camera having a main sector and a sub-sector and mechanism for varying an opening angle defined by the main sector and the sub-sector. A differential mechanism is provided between the main sector and the sub-sector, including a mechanism for absorbing vibration provided between the main sector and the sub-sector to prevent irregular variation of the shutter speed.

3 Claims, 4 Drawing Figures

INVENTOR
INAO MORIYAMA

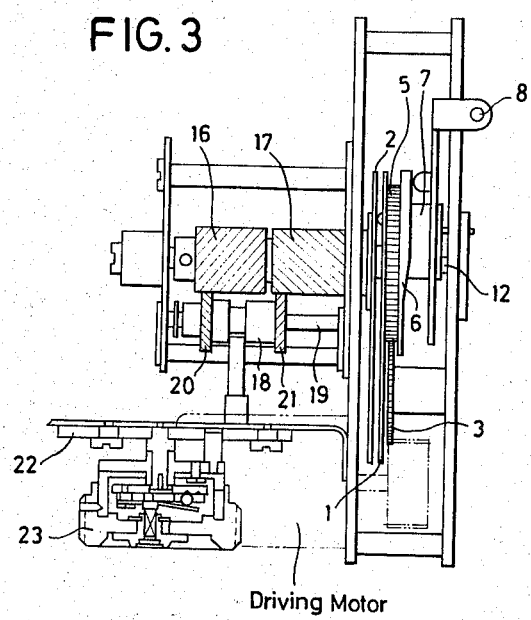
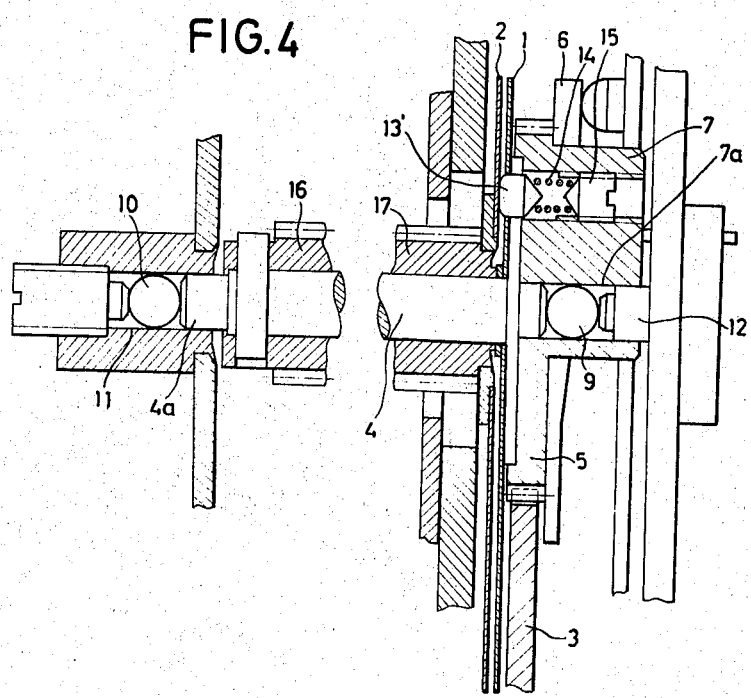

ns with other elements for photographing informations.
VARIABLE SECTOR SHUTTER DEVICE The present invention relates to a variable sector shutter device for a camera, particularly for a cinematographic camera, and is concerned with improvements of a variable sector shutter in which an opening angle of the variable sector shutter device is varied by means of a differential mechanism provided between a main sector and a sub-sector.

An object of the present invention is to prevent irregularity in shutter time due to undesirable clearance between the main sector and the sub-sector, particularly in case the opening angle is rather small, and a feature of the present invention is that a means for absorbing vibration is provided between the main sector and the sub-sector to prevent the irregularity in shutter time.

Another feature of the present invention is that a toothed lock washer is used as the absorbing means.

Still another feature of the present invention is that the vibration between the main sector and the sub-sector is absorbed by means of a spring biased contact element provided integrally with one of the main sector and the sub-sector and in contact with the other.

The present invention will be described by referring to the attached drawings.

FIG. 3 is a partially sectioned side view of a modified embodiment of the present invention; and FIG. 4 is a cross sectional view showing in detail main parts of the embodiment shown in FIG. 3.

Figure 1:
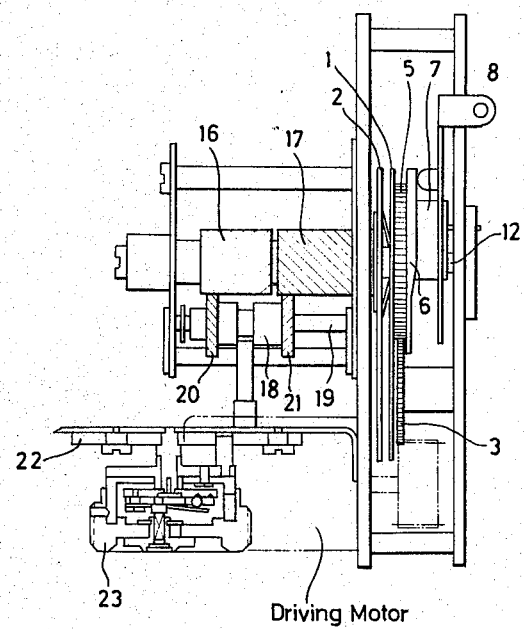
FIG. 1 is a partially sectioned side view of one embodiment of the present invention.
Figure 2:
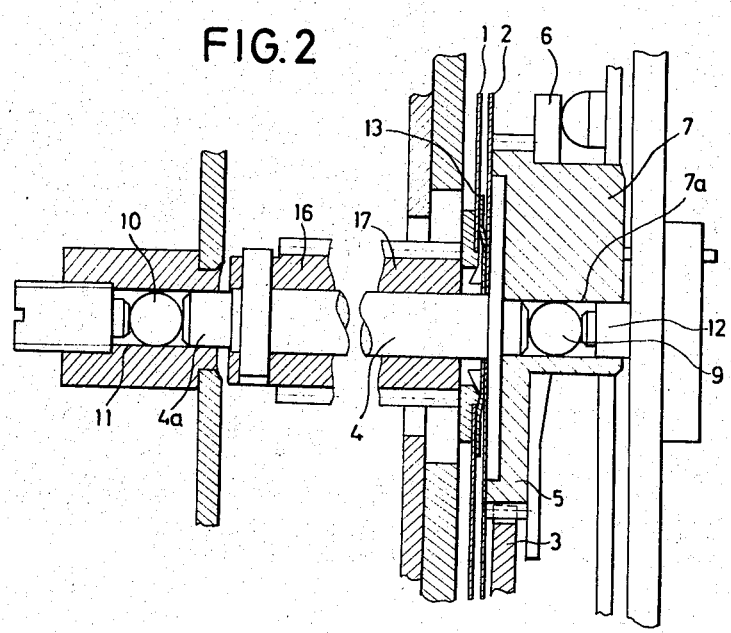
FIG. 2 is a cross sectional view showing in detail main parts of the embodiment shown in FIG. 1.

In FIGS. 1 and 2, a main sector 1 and a subsector 2 are shown. The main sector 1 rotates fixedly with a shutter driving shaft 4 having a gear 5 fixed thereon to which the driving power from a driving system is transmitted through an intermediate gear 3. An end cam 6 is fixedly assembled with the gear 5, and a periphery cam 7 is integral with the gear 5. A frame 8 having a claw is driven respectively by the end cam 6 and the periphery cam 7.

Thus a claw mechanism is adapted to work in good order. The shutter driving shaft 4 is received between thrust balls 9 and 10 at its both ends. One end 4a of the driving shaft 4 is fittedly supported on the inside surface 11 of a fixed bearing. Another fixed bearing is formed in an opening 7a of the periphery cam 7 so as to center correctly the shutter driving shaft 4. A toothed lock washer 13 is provided in a properly biased state between the main sector 1 and the sub-sector 2 so as to maintain a relative angular position of the sub-sector constant to the main sector during the operation of the device. Helical gears 16, 17 having the same helical angle and different helical directions from each other are arranged with the former provided fixedly with the shutter driving shaft 4 integral with the main sector 1 and the latter provided fixedly with the sub-sector 2. A slidable part 18 is supported by a journal 19 which is fixedly provided. The slidable part 18 is provided with helical gear portions 20 and 21 engaged with the helical gears 16 and 17, respectively.

For varying the opening angle, the slidable part 18 is slid along the journal 19, and thereby the sub-sector is differentially moved in respect to the main sector so that a desired opening angle is attained. By varying the opening angle, fade-in effect and fade-out effect may be given and double exposure may be effected as well as a high speed photographing with flash synchronization may be effected by setting the opening angle small.

Further, the opening angle may be varied in association with other elements for photographing informations.

In the embodiment shown in FIG. 1 an intermediate lever 22 is slided by means of a dial 23 for varying the opening angle. The dial 23 is provided outside the camera to effect sliding of the slidable part 18.

In this case, changing of the position of the dial 23 due to the motion of the shutter device is prevented as a click mechanism is provided in the dial 23.

Next in FIGS. 3 and 4, the same members are referred to by the same numbers as in FIGS. 1 and 2. Description will be made only on differences between the embodiment shown in FIGS. 1 and 2 and the embodiment shown in FIGS. 3 and 4. A spring biased contact element 13' contacts the subsector 2 from the side of the main sector 1 so as to maintain a relative angular position of the sub-sector constant to the main sector. A coil spring 14 is arranged for biasing the contact element 13', and the biasing force of the coil spring 14 is adjustable by an adjusting screw 15.

According to the present invention irregular variation in shutter speed is prevented by providing a means for absorbing vibrational motion between the main sector and the sub-sector, and irregular results in exposed frames are avoided even in case of a high shutter speed and thus practical advantages are obtained.

Particularly in both the first embodiment shown in FIGS. 1 and 2 and the second embodiment shown in FIGS. 3 and 4, resilient force is not applied directly between the main sector and the sub-sector, and in the first embodiment the vibration is absorbed by frictional force between the main sector and the sub-sector with the aid of the toothed lock washer 13, and in the second embodiment the vibration is absorbed by frictional force between the main sector and the sub-sector by aid of the contact element 13' adjustably biased by the spring 14, and thus the simplified construction of the device brings advantageous results. What is claimed is:

1. A shutter device with a variable opening angle for a motion picture camera, comprising a main sector and a sub-sector for affording a variable opening angle, said sub-sector being movable in respect to said main sector for varying said opening angle defined by said main sector and sub-sector, means for maintaining a predetermined angular position between said sub-sector and said main sector in a fixed manner during normal operation of the device, shutter driving means coupled to said main sector and said sub-sector, said driving means includes a shutter driving shaft coupled to said main sector and a pair of thrust balls disposed in spaced relationship for rotatably receiving the opposite ends of said shutter driving shaft for correctly centering said shutter driving shaft, differential gear means for varying the opening angle, said gear means includes a first pair of helical gears one of which is fixed to said sub-sector and the other of which is fixed to said shutter driving shaft, and a second pair of helical gears disposed in engagement with said first pair of helical gears respectively to drive said sub-sector relative to said main sector for varying the opening angle, control means associated with said second pair of helical gears for selecting the variable opening angle, and absorbing means for absorbing any irregular movement in the direction in which the opening angle is varied, said absorbing means includes a contact element disposed in contact with said sub-sector, a spring member disposed in contact with said contact element for biasing said contact element into contact with said sub-sector, and an adjusting member, said contact element being mounted in said main sector and extending therethrough into contact with said sub-sector, said adjusting member comprises a set screw adjustably engageable with said spring member in spaced relationship from said contact element for selectively varying the frictional contact of said contact element with said sub-sector.

2. A shutter device, as set forth in claim 1, wherein said control means comprises a dial, a click mechanism engaged with said dial for holding the dial in the fixed position selected for controlling the variable opening angle.

3. A shutter device with a variable opening angle for a motion picture camera, comprising a main sector and a sub-sector for affording a variable opening angle, said sub-sector being movable in respect to said main sector for varying said opening angle, a shutter driving shaft coupled to said main sector for rotation therewith, thrust balls spaced apart for rotatably receiving the opposite ends of said shutter driving shaft for correctly centering said driving shaft, driving gear fixed to said shutter driving shaft for driving said shaft, film transporting means for transporting the film, said transporting means includes an end cam fixedly assembled with said driving gear, a periphery cam integral with said driving gear, a claw driven respectively by said end cam and said periphery cam, differential gear means for varying the opening angle and engaged with said sub-sector for moving it relative to said main sector, operating means associated with said differential gear means for selecting the variable opening angle, and absorbing means for absorbing any irregular movement in the direction in which the opening angle is varied, said absorbing means includes a contact element disposed in contact with said sub-sector, a spring member in contact with said contact element and biasing said contact elemtnt against said sub-sector, and an adjusting member, said contact element being mounted in said main sector and extending therethrough into contact with said sub-sector, said adjusting member comprises a set screw adjustably engageable with said spring member in spaced relationship from said contact element for selectively varying the frictional contact of said contact element with said sub-sector. with said contact element and biasing said contact elemtnt against said sub-sector, and an adjusting member, said contact element being mounted in said main sector and extending therethrough into contact with said sub-sector, said adjusting member comprises a set screw adjustably engagable with said spring member in spaced relationship from said contact element for selectively varying the frictional contact of said contact element with said sub-sector.

* * * * *